United States Patent Office 3,237,376
Patented Mar. 1, 1966

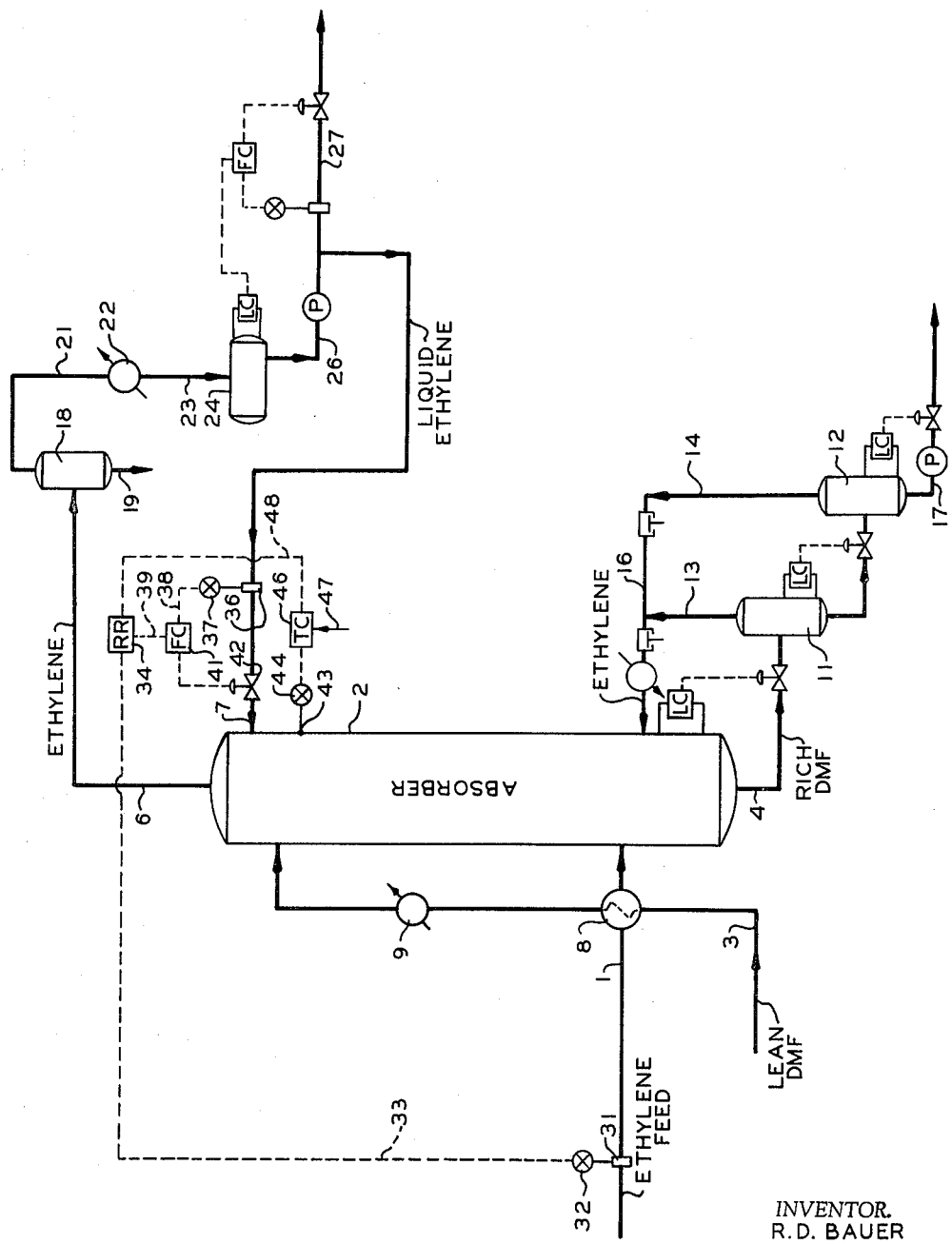

3,237,376
CONTROL OF SELECTIVE ABSORPTION PROCESS AND APPARATUS
Robert D. Bauer, Bartlesville, Okla., assignor to Phillips Petroleum Company, a corporation of Delaware
Filed June 15, 1962, Ser. No. 202,778
5 Claims. (Cl. 55—19)

This invention relates to the control of a selective absorption process for the purification of gases. More particularly, it relates to a method and apparatus for control of a selective absorption process wherein a gas stream, such as ethylene-containing gas stream, is purified by contacting the same with a solvent, such as dimethylformamide, selective for one or more constituents, such as acetylene, in the gas stream.

Selective absorption processes for the purification of gas streams are well known in the art. Often such a process is carried out in a column having a plurality of liquid-vapor contact trays where the gas feed stream is contacted in countercurrent flow with a liquid solvent selective for one or more undesired constituents in the gas stream under the prevailing conditions of operation. An off-stream or overhead of purified gas is withdrawn from the column as is a bottom liquid stream comprising the solvent enriched with one or more of the undesired feed constituents. In order to minimize the entrainment of solvent in the overhead, to increase the selectivity of the solvent, and to control the heat balance of the absorption process, it is known to introduce into the column near the top thereof a liquid, usually of essentially the same chemical composition of the off-gas, such as some of the condensed overhead, sometimes called a wash liquid. It is this particular absorption process that is the concern of this invention, especially as it is applied in the purification of an ethylene-containing gas stream with dimethylformamide for the removal of acetylene from the gas stream.

In such a selective absorption process, there are certain problems attendant the operation thereof which have a bearing on the efficiency of the operation. Upsets in the operation may occur, such as variations in flow rates and temperatures of the gas feed, selective solvent and wash liquid streams, and changes in the amounts of the components in the gas feed stream. Unless such upsets are compensated for, excessive entrainment of solvent in the overhead, production of off-specification overhead product, loss of desired feed constituents, overloading of contact trays, etc., can occur and lower the efficiency of the operation.

Accordingly, an object of this invention is to improve the control of a selective absorption process for the purification of gases. Another object is to provide an improved method and apparatus for control of a selective absorption process, for example, the process wherein an ethylene-containing gas stream is contacted with dimethylformamide to remove acetylene from the gas stream. Another object is to provide an improved control system which will increase and maintain the efficiency of a selective absorption process by automatically maintaining steady-state conditions and compensating for certain upsets in the operation. Another object is to provide an improved system for a selective absorption process whereby the desired temperature of the absorption operation and desired wash liquid-to-gas feed flow ratio are maintained. Other objects and advantages of this invention will become apparent to those skilled in the art from the following discussion, appended claims, and accompanying drawing which shows a flow sheet of a selective absorption process with features of this invention associated therewith.

Briefly, I have discovered that the operation of the above-mentioned selective absorption process can be controlled and the efficiency thereof maintained at a high lever by a novel control system, wherein a primary or master signal is established representative of the difference between a measured temperature in the column and a desired temperature, said difference being representative of the desired ratio of wash liquid flow to feed flow, a secondary or slave signal is established representative of the product of said first signal and a signal representative of feed flow, said second signal being representative of the desired flow rate of the wash liquid, the flow rate of the wash liquid is controlled in response to said secondary signal, and this control is changed in response to the requirements dictated by said primary signal and said feed flow signal. Variations in feed flow rate, feed composition, and temperatures of the feed, solvent and wash liquid will be detected by this control system and compensated for to maintain a stabilized wash liquid-to-feed flow rate ratio and to maintain a direct relationship between the temperature of the operation and the column heat balance.

The drawing illustrates the kind of selective absorption process which can be controlled by this invention. Basically, it illustrates the contact of an ethylene-containing gas stream with dimethylformamide for the selective absorption of small amounts of acetylene from the gas stream. (Hereinafter, the abbreviation DMF will be used when referring to dimethylformamide, such abbreviation of the latter being commonly used in the prior art.)

Referring now to the drawing in detail, an ethylene-containing gas stream 1 is introduced into the lower end of an absorber column 2 where it is contacted with a lean cold, dry DMF stream 3 introduced into the column midpoint. Column 2 is provided with the usual liquid-vapor contact means, such as bubble cap trays. The DMF absorbs the acetylene from the rising gas stream by reason of countercurrent contact, and the resulting rich DMF stream is removed via line 4 from the bottom of column 2. A purified ethylene gas stream is removed overhead via line 6 from the column 2 and a wash liquid such as liquid ethylene is introduced via line 7 into the top of the column.

The ethylene-containing gas stream will be typically a gas stream obtained principally by the dehydrogenation of low-boiling paraffin hydrocarbon such as ethane, propane, butane, etc. In the process of manufacture of ethylene from paraffins, various side products are formed, such as acetylene, carbon dioxide, carbon monoxide, and hydrogen. The largest use of ethylene today lies in the catalytic polymerization field for the production of polymers, and due to the sensitivity of the various polymerization catalysts to materials, such as acetylene, it is desirable to first remove acetylene from the feed material before employing it in the polymerization process. Where ethylene is obtained by the pyrolysis of ethane, it is the usual practice to treat the resulting gaseous effluent to remove water and carbon monoxide before removal of acetylene from the raw ethylene gas feed. So, the ethylene feed stream 1 in the drawing will be typically an ethylene-containing gas feed stream having the water and carbon monoxide removed therefrom. In a typical ethylene plant, ethylene feed stream 1 will be obtained from the accumulator of an ethylene-ethane splitter, the flow rate of ethylene feed stream 1 being regulated by a liquid level controller on said accumulator. As such, variations in this flow rate can occur.

It is a common practice to increase the selectivity of DMF for the acetylene by carrying out the absorption at the low temperatures of about −35° F. to 75° F. Low absorption temperatures can be enhanced by passing the lean DMF stream 3 through indirect heat exchanger 8 associated with ethylene feed stream 1, then to pass the lean DMF stream through a cooler 9, such as a propylene chiller, and introduce the cold lean DMF at a temperature of 0° F. or lower, typically —3° F., near the top of column 2 below the top tray.

The ethylene feed stream is introduced near the bottom of colume 2 at a point above the lowermost tray, and generally at a temperature of 25 to 45° F., typically about 30° F. The gas stream passes upwardly countercurrent to the DMF, the quantity of DMF required to effect removal of the acetylene being dependent on the amount of acetylene present in the ethylene feed stream. Usually, between about 75 and 175 pounds of DMF will be used per pound of acetylene in the feed.

In passing through the absorber column 2, the DMF absorbs not only acetylene but also tends to absorb a portion of the ethylene from the feed. Recovery of the ethylene unavoidably absorbed in the DMF can be accomplished by passing the rich DMF absorber bottoms 4 through a primary flash drum 11 and a secondary flash drum 12 wherein successive reductions in pressure are made. The gases which are released from the flash drums 11 and 12 via lines 13 and 14, respectively, are returned to the absorber column 2 via line 16 after being compressed and heated. The primary flash drum 11 is usually operated to a pressure of about 50 to 75 p.s.i.a. and secondary flash drum 12 is operated at about 25 to 30 p.s.i.a. Liquid from the secondary flash drum 12, which comprises DMF and acetylene, is removed via line 17 and passed to a DMF stripper where acetylene is removed and the lean DMF recycled to the absorber column 2.

The absorber overhead vapor removed from the top of the column 2 via line 6 comprises ethylene substantially free of acetylene and it can be passed to a knockout drum 18 and then passed via line 21 through a cooler 22 such as a propylene chiller, and the resulting condensed ethylene passed via line 23 to a surge drum 24. Liquid ethylene is withdrawn via line 26 from the latter and some of it can be recycled via line 7 as wash liquid to the top of the column while the balance can be passed via line 27 to a series of towers for the removal of other undesired components in the ethylene stream, such as carbon dioxide, oxygen, and water.

The function of the wash liquid stream 7, returned to the top of the column 2 above the top tray, is many-fold. The wash liquid serves to remove solvent vapors or droplets of liquid solvent, or both, from the overhead. This is important, because in some processes where ethylene is used even a slight amount of entrained solvent will poison catalysts or produce an inferior product. Further, the wash liquid serves as an effective drying agent. It also serves to presaturate the DMF with ethylene and increase the selectivity for acetylene. Also, because of its low temperature, e.g. —25° F., it provides a heat balance stream for the column operation. If the wash liquid stream has a flow rate which is too low, excessive entrainment of the solvent in the overhead will occur as well as excessive absorption of ethylene gas in the DMF bottom product. If the flow rate of the wash liquid stream is too high, the heat balance of the column is upset, trays in the column are flooded, and off-specification product is produced. For proper operation of the column, there will be a range of values for the ratio of wash liquid flow rate to feed flow rate, e.g., from 1:7 to 1:5, which will prevent the top tray from running dry and prevent flooding of the column.

The selective absorption process described so far is conventional and by itself does not constitute my invention. I will now describe my improved control system for improving the operation and efficiency of such an absorption process.

Ethylene feed line 1 is provided with a flow measurement device 31 and flow transmitter 32 to establish a signal 33 representative of the flow rate of the ethylene feed stream, and this signal is transmitted to a ratio relay 34, such as a Pneumaticset Ratio Relay, made by the Foxboro Company, and described in the Foxboro catalogue CA–400SPEC–364 (1956). The liquid ethylene wash stream 7 is also provided with a flow measurement device 36 and flow transmitter 37 to establish a signal 38 representative of the flow rate of the recycled liquid ethylene, and this signal is transmitted to a flow controller 41, such as a M/58 Controller, made by the Foxboro Company, and described in the Foxboro bulletin IN–1–56A, pages 14–15 (1956). Ratio relay 34 produces an output signal 39 which acts as a set point-adjusting signal for flow controller 41, which operates to manipulate flow control valve 42 in wash liquid line 7. The absorber column 2 is provided with a temperature measuring device 43, such as a thermocouple, and the detected temperature is transmitted by temperature transmitter 44 to a temperature controller 46, such as a M/58 Controller, made by the Foxboro Company. The latter compares the detected temperature signal with a desired temperature provided by a setpoint 47. Temperature controller 46 produces an output signal 48 related to the difference between said measured and desired temperatures, and this difference is representative of the demanded ratio of wash liquid flow to feed flow. Signal 48 is transmitted to ratio relay 34. The latter can be provided with conventional limit stops to limit the range of ratio setpoint, e.g., 1:7 to 1:5. If demanded ratio signal 48 is outside the limited range, e.g., 1:8, the signal 48 will be limited, e.g., to 1:7. The desired ratio signal is multiplied in ratio relay 34 by feed flow signal 33. The output signal 39 is thus representative of the desired wash liquid flow rate. This output signal 39 functions as a setpoint for flow controller 41, where it is compared with the measured wash liquid flow rate signal 38.

The magnitude of the setpoint 47 of temperature controller 46 is determined by the concentration of acetylene in the ethylene feed stream 1. The greater the concentration of the acetylene in the feed stream, the greater the amount of heat of solution of the acetylene in the DMF and hence the greater wash liquid-to-feed flow rate ratio required. The concentration of the acetylene in the ethylene feed stream which can be determined periodically by spot analysis, etc., or continuously determined by means of a rapid cycle analyzer, such as a chromatographic analyzer. The latter can produce an output signal which can function as the setpoint signal 47 of temperature controller 46. Thus, it should be evident that an increase in the concentration of acetylene in the ethylene feed stream 1 will result in a higher temperature detected by thermocouple 43. This high temperature, when compared to a desired temperature 47, will call for a higher wash liquid-to-feed flow rate ratio, and this requirement is transmitted by signal 48 to the ratio relay 34 so as to cause flow controller 41 to increase the opening of control valve 42. Conversely, a drop in concentration of acetylene in the feed stream will result in a lower detected temperature and adjustment of control valve 42 to meet the demands of a lower wash liquid-to-feed flow rate ratio.

In the event of significant fluctuations in the flow rate of the ethylene feed stream 1, ratio relay 34 will accordingly cause flow controller 41 to adjust flow control valve 42 and regulate the flow rate of the liquid ethylene to insure a stable wash liquid-to-feed flow rate ratio. For example, in the event that the feed flow rate increases, the ratio relay 34 will compensate therefor by causing valve 42 to open and increase the flow rate of the liquid ethylene. Conversely, in the event that the feed flow rate falls off, the ratio relay 34 will accordingly cause the decrease in the flow rate of the liquid ethylene, so as to stabilize the flow rate ratio.

Fluctuations in the temperatures of the ethylene feed stream, the lean DMF stream, and/or the liquid ethylene stream, which cause an upset in the heat balance of the column, will be detected by thermocouple 43. Material fluctuations will be communicated to ratio relay 34 by signal line 48, and the flow rate of the liquid ethylene will be adjusted in order to compensate for such temperature fluctuations in the same way described above where they occur fluctuations in the acetylene content of the ethylene feed stream, so as to cause the temperature of the column to return to setpoint 47.

It should be obvious now that significant changes in column temperature and in the ethylene feed charge rate both will produce an effect on the setpoint of flow controller 41. The ratio relay 34 permits the positioning of a single control element, i.e. flow controller 41, by these two separate but inter-related variables. Fluctuations in the acetylene content of the feed stream and the efficiency in the absorption operation are corrected since the output temperature signal from temperature controller 46—the primary control element—feeds back into the control loop. Also, this control system eliminates the lag which normally would exist in changes in feed flow rate, the flow controller 41—the secondary control element—immediately correcting the flow rate of the liquid ethylene for changes in the feed flow rate.

Selective solvents which can be employed for the removal of acetylene and/or methylacetylene from olefins include, in addition to dimethylformamide, acetone, butyrolactone, N-methyl-2-pyrrolidone and dimethylsulfoxide. The invention is also applicable to the removal of diolefins from olefins, especially the separation of butadiene from butenes, employing either anhydrous or aqueous furfural as the solvent, to the separation of propylene from propane using dimethylformamide, and the separation of aromatic hydrocarbons from aliphatic hydrocarbons employing as solvent either diethylene glycol or triethylene glycol.

The following is an example of the use of my improved control system in a selective absorption process for the removal of acetylene from an ethylene-containing gas stream. It should be understood that the various conditions, etc., recited in this example are merely illustrative of a preferred embodiment and should not be construed to unduly limit this invention.

Referring again to drawing, an ethylene-containing feed stream, obtained from an accumulator of an ethylene-ethane splitter, is passed via line 1 to absorber column 2. The feed stream 1 flows at a rate of 900,000 lbs. per day, the flow rate being controlled by the liquid level of said accumulator. The temperature of the ethylene feed stream 1 introduced into column 2 is 30° F. and it has the following composition:

*Table I*

| Composition: | Wt. percent |
|---|---|
| Ethylene | 95.85 |
| Acetylenes | 1.41 |
| Carbon dioxide | 0.31 |
| Methane | 0.15 |
| Ethane | 2.28 |

Absorber column 2 is provided with 40-liquid-vapor contact trays and is operated at a top temperature of −25° F., a bottom temperature of 32° F., a pressure of 260 p.s.i.g., and a volume flow rate ratio of liquid ethylene-to-feed of 1:6.

Lean DMF, at a temperature of −3° F., is introduced onto the fifth tray of column 2 at a flow rate of 1,500,000 lbs. per day, and with the following composition:

*Table II*

| Composition: | Wt. percent |
|---|---|
| Ethylene | 9.13 |
| Ethane | 0.22 |
| Methane | 0.02 |
| Carbon dioxide | 0.03 |
| DMF | 90.60 |

Liquid ethylene is introduced via line 7 onto the first tray of column 2 at a temperature of −25° F., a flow rate of 150,000 lbs. per day, and with the following composition:

*Table III*

| Composition: | Wt. percent |
|---|---|
| Ethylene | 97.50 |
| Methane | 0.15 |
| Ethane | 2.35 |

Rich DMF bottom product is withdrawn from the bottom of column 2 at a temperature of 32° F., a flow rate of 1,700,000 lbs. per day, and with the following composition:

*Table IV*

| Composition: | Wt. percent |
|---|---|
| Ethylene | 18.65 |
| Acetylenes | 0.75 |
| Carbon dioxide | 0.19 |
| Methane | 0.04 |
| Ethane | 0.43 |
| DMF | 79.94 |

Under steady-state operation of the absorber column 2, the temperature of the liquid on the eighth tray of the column, as detected by thermocoupe 43, is −13° F., the latter being the same as the setpoint signal 47 for the setting of temperature controller 46. At still another point in the operation, an upset in the heat balance requirements of column 2 occurs, thermocouple 43 detecting an increase in temperature on the eighth tray to −10° F. Accordingly, an output signal from temperature controller 46 is transmitted by signal line 48 to dictate an adjustment in the flow rate ratio. Ratio relay 34 accordingly puts out an output signal 39 causing flow controller 41 to increase the flow rate of liquid ethylene in line 7 so as to reestablish the desired heat balance. In another point in operation, an upset in the heat balance appears such that the thermocouple 43 detects a lower temperature of −15° F. Accordingly, temperature controller 46 transmits a ratio adjustment signal 48 to ratio relay 34. As a result, flow controller 41 adjusts the opening of flow control valve 42 in the liquid ethylene line 7 to decrease the flow rate of liquid ethylene so as to reestablish the desired heat balance.

In subsequent operation, an upset in the flow rate of the feed stream 1 occurs, whereby the flow rate of the feed stream is increased to 900,500 lbs. per day. This upset is immediately sensed by ratio relay 34, and accordingly the output signal therefrom causes flow controller 41 to increase the opening of valve 42 so as to increase the flow rate of the liquid ethylene in stream 7 to 150,000 lbs. per day. At another point in the operation, an upset in the feed flow rate of the ethylene feed stream 1 occurs, this time the flow rate dropping to a value of 800,500 lbs. per day. Again, this change in flow rate of the feed stream 1 is detected by the ratio relay 34, and the requirements for a lower liquid ethylene-to-feed flow rate ratio are transmitted to flow controller 41, causing valve 42 to decrease the flow rate of liquid ethylene to 133,400 lbs. per day to maintain the desired flow rate ratio.

Various modifications and alterations of this invention will become apparent to those skilled in the art from the foregoing discussion and accompanying drawing, and it should be understood that this invention is not to be limited to that set forth herein for illustrative purposes.

I claim:
1. In a selective absorption process, wherein a multicomponent gas feed stream is contacted with a liquid selective absorbent in a column, a gas is withdrawn from the top of the column, and a wash liquid stream is introduced into the column near the top thereof, the improvement comprising establishing a first signal directly responsive to the difference between the temperature in said column at a predetermined point therein and a desired temperature; establishing a second signal directly responsive to the flow rate of said gas feed stream; establishing a third signal directly responsive to the flow rate of said wash liquid stream; establishing a fourth signal directly responsive to the ratio between the second and third signals; adjusting the fourth signal within a predetermined range as a function of the first signal; comparing said adjusted fourth signal with said third signal; producing a fifth signal directly responsive to the difference between said third and adjusted fourth signals and regulating the flow rate of said liquid wash stream introduced into the column in accordance with said difference to maintain a stabilized wash liquid to feed flow rate ratio in said column.

2. A process according to claim 1 wherein the feed stream comprises ethylene and acetylene.

3. In a selective absorption process wherein a multi-component gas feed stream is introduced into a vertical liquid-vapor contact column, a liquid absorbent selective for an undesired component in said gas feed stream is also introduced into said column and flows countercurrent to the rising gas stream in said column, a purified gas is withdrawn overhead from said column, a wash liquid stream is introduced into said column near the top thereof, and a liquid stream comprising said absorbent and mixed with said undesired components is withdrawn from the bottom of said column, the improvement comprising measuring the temperature at a predetermined point in said column and producing a first signal directly responsive to said temperature; producing a second signal which is directly responsive to the difference between the measured temperature and a predetermined temperature; measuring the flow rate of said gas feed stream and producing a third signal directly responsive to said flow rate; measuring the flow rate of said wash liquid and producing a fourth signal directly responsive thereto; producing a fifth signal directly responsive to the ratio of said third and fourth signals; adjusting the fifth signal within a predetermined range as a function of the second signal; comparing said adjusted fifth signal with said fourth signal; producing a sixth signal directly responsive to the difference between said fourth and fifth signals and regulating the flow of said wash liquid in accordance with said difference to maintain a stabilized wash liquid to feed flow rate ratio in said column.

4. The process according to claim 3, wherein said selective absorbent is dimethylformamide, and said wash liquid is liquid ethylene.

5. In an absorption system including an absorber column, first conduit means to introduce a multi-component gas feed stream into said column, second conduit means to introduce a selective absorbent into said column in countercurrent contact with a rising gas stream therein, third conduit means for withdrawing a gas from the top of said column, and fourth conduit means for introducing into said column near the top thereof a wash liquid stream, the improvement therewith of a control system comprising first means to establish a first signal directly responsive to the difference between the temperature in said column at a predetermined point therein and a desired temperature; second means to establish a second signal directly responsive to the flow rate of said gas feed stream; third means to establish a third signal directly responsive to the flow rate of said wash liquid; fourth means to establish a fourth signal directly responsive to the ratio of said second and third signals; fifth means to adjust the fourth signal within a predetermined range as a function of the first signal; sixth means for comparing said adjusted fourth signal with said third signal; seventh means for producing a seventh signal directly responsive to the difference between said third and adjusted fourth signals and means regulating the flow of said wash liquid in accordance with said difference to obtain a stabilized wash liquid feed flow rate ratio in said column.

References Cited by the Examiner

UNITED STATES PATENTS

| 2,519,874 | 8/1950 | Berg | 55—61 |
| 2,580,651 | 1/1952 | Boyd | 196—141 |
| 2,974,100 | 3/1961 | Mitchell | 196—14 |
| 2,985,565 | 5/1961 | Bellinger | 196—132 |
| 3,020,213 | 2/1962 | Lupfer | 196—132 |
| 3,050,450 | 8/1962 | Kleiss et al. | 202—160 |
| 3,060,662 | 10/1962 | Parsons et al. | 55—19 |
| 3,080,219 | 3/1963 | Harvey. | |
| 3,094,482 | 6/1963 | Vineyard | 196—141 |
| 3,106,462 | 10/1963 | Cottle | 55—20 |
| 3,123,086 | 3/1964 | Kleiss | 137—90 |

FOREIGN PATENTS

| 1,189,909 | 3/1959 | France. |
| 887,295 | 1/1962 | Great Britain. |

REUBEN FRIEDMAN, *Primary Examiner.*